(12) United States Patent
Jolly et al.

(10) Patent No.: US 7,222,199 B2
(45) Date of Patent: May 22, 2007

(54) CIRCUIT AND METHOD FOR TRANSFERRING LOW FREQUENCY SIGNALS VIA HIGH FREQUENCY INTERFACE

(75) Inventors: Paul A. Jolly, Rescue, CA (US); Ronald W. Swartz, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 10/814,106

(22) Filed: Mar. 31, 2004

(65) Prior Publication Data

US 2005/0228925 A1 Oct. 13, 2005

(51) Int. Cl.
G06F 5/06 (2006.01)
(52) U.S. Cl. .................. 710/60; 709/233; 710/305; 710/106
(58) Field of Classification Search .............. 710/25; 709/233; 713/500; 327/291
See application file for complete search history.

(56) References Cited

U.S. PATENT DOCUMENTS

| | | | | | |
|---|---|---|---|---|---|
| 3,421,147 | A | * | 1/1969 | Wolf, Jr. et al. ............ | 710/60 |
| 3,819,906 | A | * | 6/1974 | Gould, Jr. ................. | 219/506 |
| 4,040,022 | A | * | 8/1977 | Takii ....................... | 713/503 |
| 5,566,300 | A | * | 10/1996 | Naoe ........................ | 714/30 |
| 5,913,075 | A | * | 6/1999 | Beers et al. ............... | 710/69 |
| 5,974,478 | A | * | 10/1999 | Wood et al. ............... | 710/22 |
| 6,192,281 | B1 | * | 2/2001 | Brown et al. .............. | 700/2 |
| 6,510,526 | B1 | * | 1/2003 | Schoenborn ............... | 713/500 |
| 2002/0108070 | A1 | * | 8/2002 | Oh .......................... | 713/600 |
| 2005/0134593 | A1 | * | 6/2005 | Janus et al. ............... | 345/520 |

OTHER PUBLICATIONS

Savoj, Jafar. A 10-GB/s CMOS Clock and Data Recovery Circuit with a Half-Rate Linear Phase Detector. IEEE Journal of Solid-State Circuits. vol. 36, No. 5, May 2001.*
Arimoto et al. A Speed-Enhanced DRAM Array Architecture with Embedded ECC. IEEE Journal of Solid-State Circuits. vol. 25, No. 1, Feb. 1990.*

* cited by examiner

Primary Examiner—Mark H. Rinehart
Assistant Examiner—Matthew Spittle
(74) Attorney, Agent, or Firm—Schwegman, Lundberg, Woessner & Kluth, P.A.

(57) ABSTRACT

An interface operates at an operating frequency. The interface includes transmitters and receivers that operate within the operating frequency of the interface. The interface also includes circuit elements to allow transmission of signals across the interface in which the signals have a frequency lower than the operating frequency of the interface.

25 Claims, 6 Drawing Sheets

CIRCUIT AND METHOD FOR TRANSFERRING LOW FREQUENCY SIGNALS VIA HIGH FREQUENCY INTERFACE

FIELD

Embodiments of the present invention relate generally to integrated circuits and, more particularly, to transferring signals between integrated circuits via an interface.

BACKGROUND

Integrated circuits such as processors, memory controllers, and graphics controllers reside in many computers and electronic systems.

A typical integrated circuit has an interface to transfer signals to and from the integrated circuit. Some integrated circuits have interfaces that operate only at a specific operating frequency such that signals having a frequency lower than the specific operating frequency may not be properly received by the interface.

Thus, in some cases, additional circuitry may be constructed to encode the low frequency signals so that the low frequency signals meet the specific operating frequency of the interface before the interface can properly receive the low frequency signal.

However, constructing the additional circuitry may waste space or may complicate the design of the integrated circuit.

DESCRIPTION OF EMBODIMENTS

Figure 1:
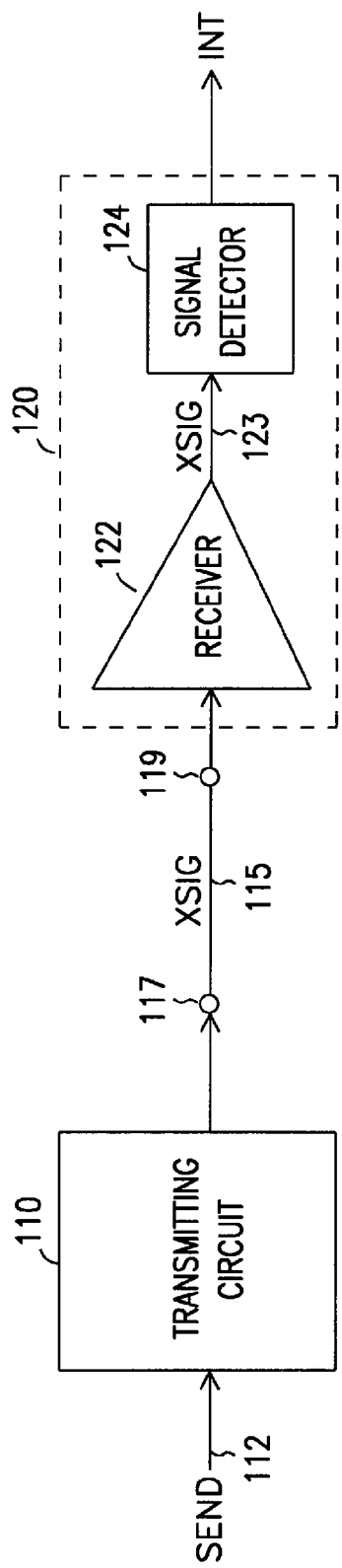
FIG. 1 shows a transmitting circuit and a receiving circuit.

The following description and the drawings illustrate specific embodiments of the invention sufficiently to enable those skilled in the art to practice the invention. Other embodiments may incorporate structural, logical, electrical, process, and other changes. In the drawings, like numerals describe substantially similar components throughout the several views. Examples merely typify possible variations. Portions and features of some embodiments may be included in or substituted for those of others. The scope of the invention encompasses the full ambit of the claims and all available equivalents.

FIG. 1 shows a transmitting circuit and a receiving circuit. Transmitting circuit 110 connects to receiving circuit 120 via a transmission line 115, which connects between terminals 117 and 119. Transmitting circuit 110 transmits a send signal SEND to receiving circuit 120. A transfer signal XSIG on transmission line 115 represents the signal levels of the SEND signal. Receiving circuit 120 receives the XSIG signal and generates an internal signal INT based on the XSIG signal.

Transmitting circuit 110 includes an input node 112 to receive the SEND signal and an output node to provide the XSIG signal to transmission line 115. Transmitting circuit 110 controls the XSIG signal based on the signal levels of the SEND signal. The SEND signal has a first signal level and a second signal level. The first signal level may be a low signal level or a signal level representing a logic zero. The second signal level may be a high signal level or a signal level representing a logic one.

Transmitting circuit 110 holds the XSIG signal at the same signal level (either low or high) when the SEND signal has the low signal level. Transmitting circuit 110 repeatedly switches (toggles) the XSIG signal between the first and second signal levels when the SEND signal has the second signal level. Thus, the presence or absence of the repeated switching of the XSIG signal represents the signal levels of the SEND signal. The XSIG signal repeatedly switches at a frequency. Hence, the frequency of the XSIG signal refers to the frequency of the XSIG signal when it repeatedly switches. The cycle (period) of the XSIG signal is an inverse of the frequency of the XSIG signal. The presence of the repeated switching of the XSIG signal exists when the XSIG signal has at least two consecutive cycles. The absence of the repeated switching of the XSIG signal exists when the XSIG signal stays at the same signal level for a time equivalent to at least one cycle of the XSIG signal.

Receiving circuit 120 includes an input node connected to transmission line 115 to receive the XSIG signal. A receiver 122 passes the XSIG signal to node 123. A signal detector 124 controls the signal level of the INT signal based on the presence or absence of the repeated switching of the XSIG signal. In some embodiments, signal detector 124 holds the INT signal at the first signal level in the presence of the repeated switching of the XSIG signal. Signal detector 124 holds the INT signal at the second signal level in the absence of the repeated switching of the XSIG signal.

FIG. 1 shows that transmitting circuit 110 and receiving circuit 110 connect together via a single transmission line 115 to transfer a single signal XSIG. In some embodiments, transmitting circuit 110 and receiving circuit 110 may connect together via multiple transmission lines to transfer differential signals.

Figure 2:
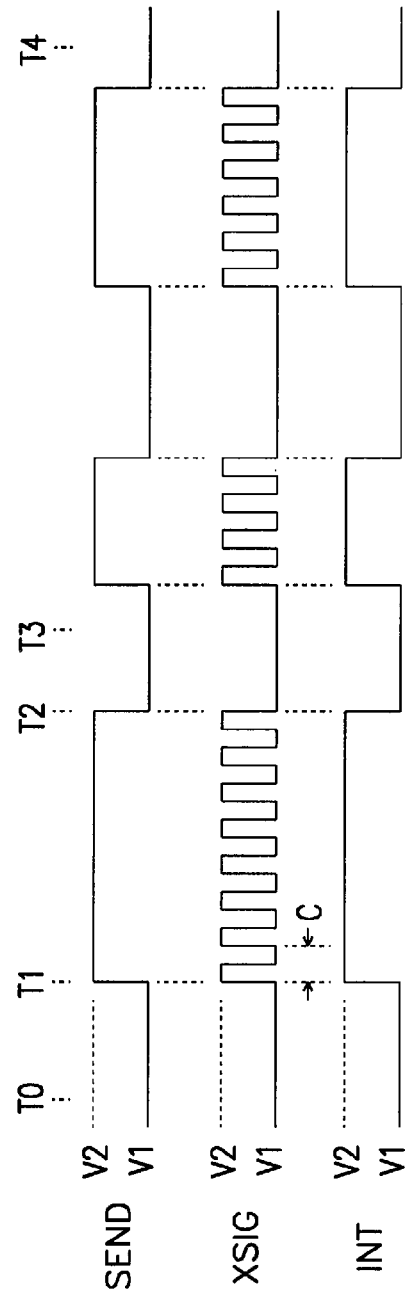
FIG. 2 shows an exemplary timing diagram for FIG. 1.

FIG. 2 shows an exemplary timing diagram for FIG. 1. In FIG. 2, T0 through T4 represent various times. V1 and V2 represent signal levels. C represents the cycle (cycle time or period) of the XSIG signal. In some embodiments, V1 represents ground and V2 represents a voltage level such as the level of the supply voltage of transmitting circuit 110 or receiving circuit 110. In other embodiments, V1 represents logic zero and V2 represents logic one.

Between T0 and T1, the SEND signal is initially at V1, the XSIG signal does not repeatedly switch, and the INT signal is at also initially at V1. Between T1 and T2, the SEND signal goes to V2, causing the XSIG signal to repeatedly switch. When signal detector 124 (FIG. 1) detects that the XSIG signal repeatedly switches between T1 and T2, signal detector 124 switches the INT signal to V2 and holds it at V2 between T1 and T2. Between T2 and T3, the SEND signal switches back to V1, causing the XSIG signal to stop switching. When signal detector 124 detects that the XSIG stops switching between T2 and T3, signal detector 124 switches the INT signal back to V1 and holds it at V1 between T2 and T3.

Between T3 and T4, the SEND, XSIG, and INT signals act in a fashion similar to the fashion between T0 and T3.

In FIG. 2, the XSIG repeatedly switches means that at two or more consecutive cycles of the XSIG signal occurs during the time that the XSIG signal repeatedly switches. For example, between T1 and T2, the XSIG repeatedly switches between V1 and V2 such that at least two consecutive cycles of the XSIG signal occurs between T1 and T2. The XSIG signal stops switching when it stays at the same signal level at a time interval equal to at least one cycle of the XSIG signal. For example, between T0 and T1 or between T2 and T3, the XSIG signal stops switching such that it stays at the same signal level (V1) at a time interval equal to at least one cycle time of the XSIG signal.

As shown in FIG. 2, the NT signal is a version of the SEND signal and the INT and SEND signal have the same frequency. The XSIG signal has a frequency higher than the frequency of the SEND and INT signals. In FIG. 2 the edges of the SEND, XSIG, and INT signals are aligned. However, offsets or misalignments may exist between the edges of the SEND, XSIG, and INT signals. The offsets may be caused by either one or both of a signal propagation delay time and a response time of circuit elements. For example, an offset may exist between the edges of the SEND signal and the INT signal at T1 and at T2 in which the edge of the INT signal may be delayed from the corresponding edge of the SEND signal by an offset value. In some embodiments, the offset value may be one or more cycles of the XSIG signal.

In some embodiments, transmitting circuit 110 and receiving circuit 120 (FIG. 1) are configured to operate at a frequency of X Hertz, which is also the frequency of the XSIG signal; the SEND signal has a frequency of S hertz, which is also the frequency of the INT signal. X and S are real numbers and S is less than X. Since X is less than S, the frequency of the SEND signal is lower than the frequency of the XSIG signal.

Since the XSIG signal has the frequency within the operating frequency of transmitting circuit 110 and receiving circuit 120, transmitting circuit 110 is able to properly transmit the XSIG signal; and receiving circuit 120 is able to properly receive the XSIG signal. Although the SEND signal has a frequency lower than the operating frequency of transmitting circuit 110, the description of FIG. 1 and FIG. 2 above shows that transmitting circuit 110 is still able to transmit the SEND signal to transmission line 115 using the XSIG signal. The description of FIG. 1 and FIG. 2 above also shows that although the SEND signal is not directly sent on transmission line 115, receiving circuit 120 is still able to generate a signal (INT) to replicate the SEND signal based on the XSIG signal. Thus, the method described in FIG. 1 and FIG. 2 allows a transmission of a low frequency signal such as the SEND signal via a high frequency interface such as transmitting circuit 110 or receiving circuit 120.

Figure 3:
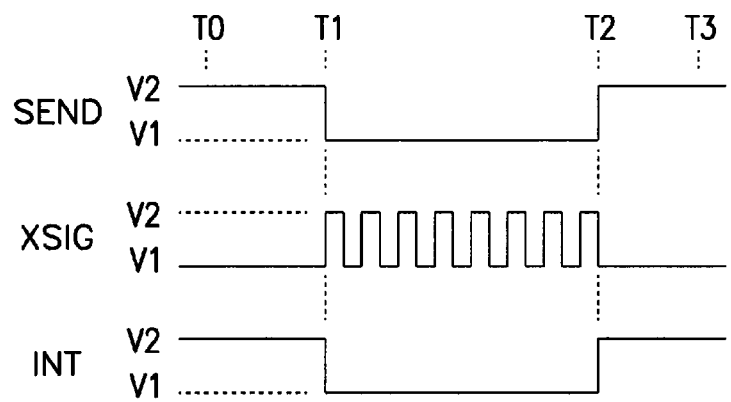
FIG. 3 through FIG. 5 show other exemplary timing diagrams for FIG. 1.
Figure 4:
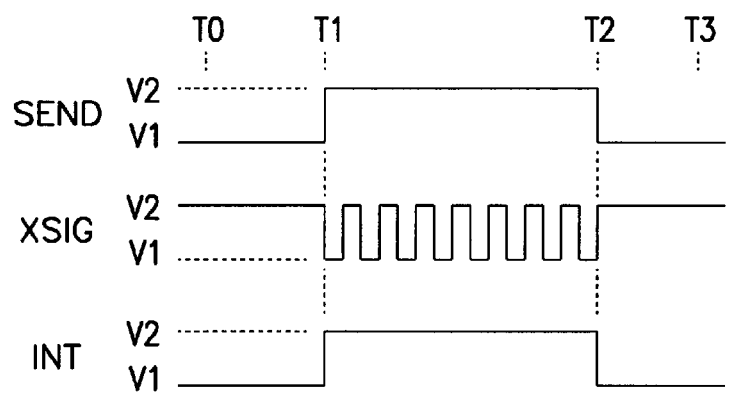
Figure 5:
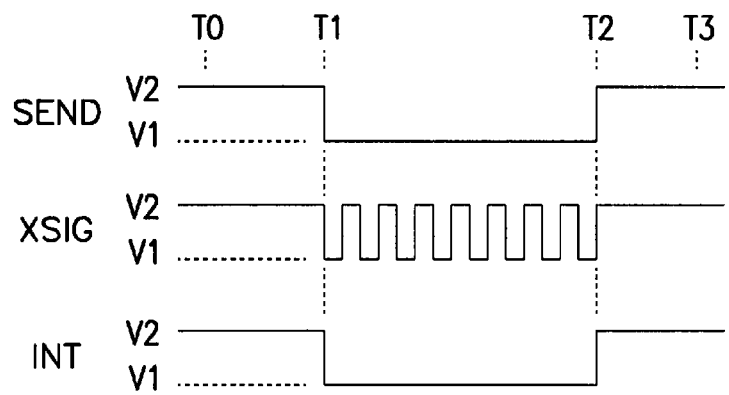

FIG. 3, FIG. 4 and FIG. 5 show various other exemplary timing diagrams for FIG. 1 in which the SEND, XSIG, and INT have different combination of signal levels.

In FIG. 3, the XSIG signal is initially at V1. The INT signal is at V1 when the XSIG signal repeated switches.

In FIG. 4, the XSIG signal is initially at V2. The INT signal is at V2 when the XSIG signal repeated switches.

In FIG. 5, the XSIG signal is initially at V2. The INT signal is at V1 when the XSIG signal repeated switches.

Figure 6:
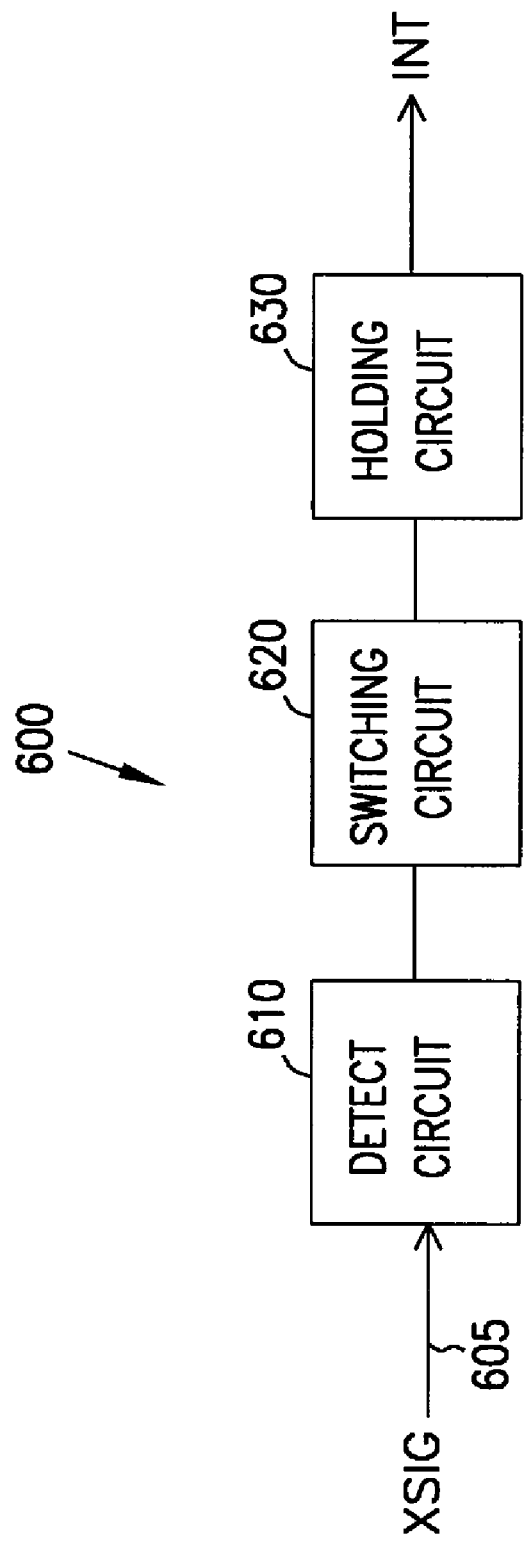
FIG. 6 shows a signal detector.

FIG. 6 shows a circuit diagram of a signal detector. Signal detector 600 may be substituted for signal detector 124 of FIG. 1. Signal detector 600 receives a transfer signal XSIG at node 605 and generates an internal signal INT. The XSIG and INT signals in FIG. 6 have signal levels similar to that of the XSIG and INT signals of FIG. 1 through FIG. 5. Signal detector 600 includes a detect circuit 610 to detect for changes in voltage levels represented by the XSIG signal. In some embodiments, the detection of the changes in the voltage levels allows signal detector 600 to identify the presence or absence of the repeated switching of the XSIG signal. Signal detector 600 also includes a switching circuit 620 to switch the INT signal between the first and second signal levels based on the XSIG signal. Signal detector 600 further includes a holding circuit 630 to hold the INT signal at a signal level based on the presence or absence of the repeated switching of the XSIG signal.

Figure 7:
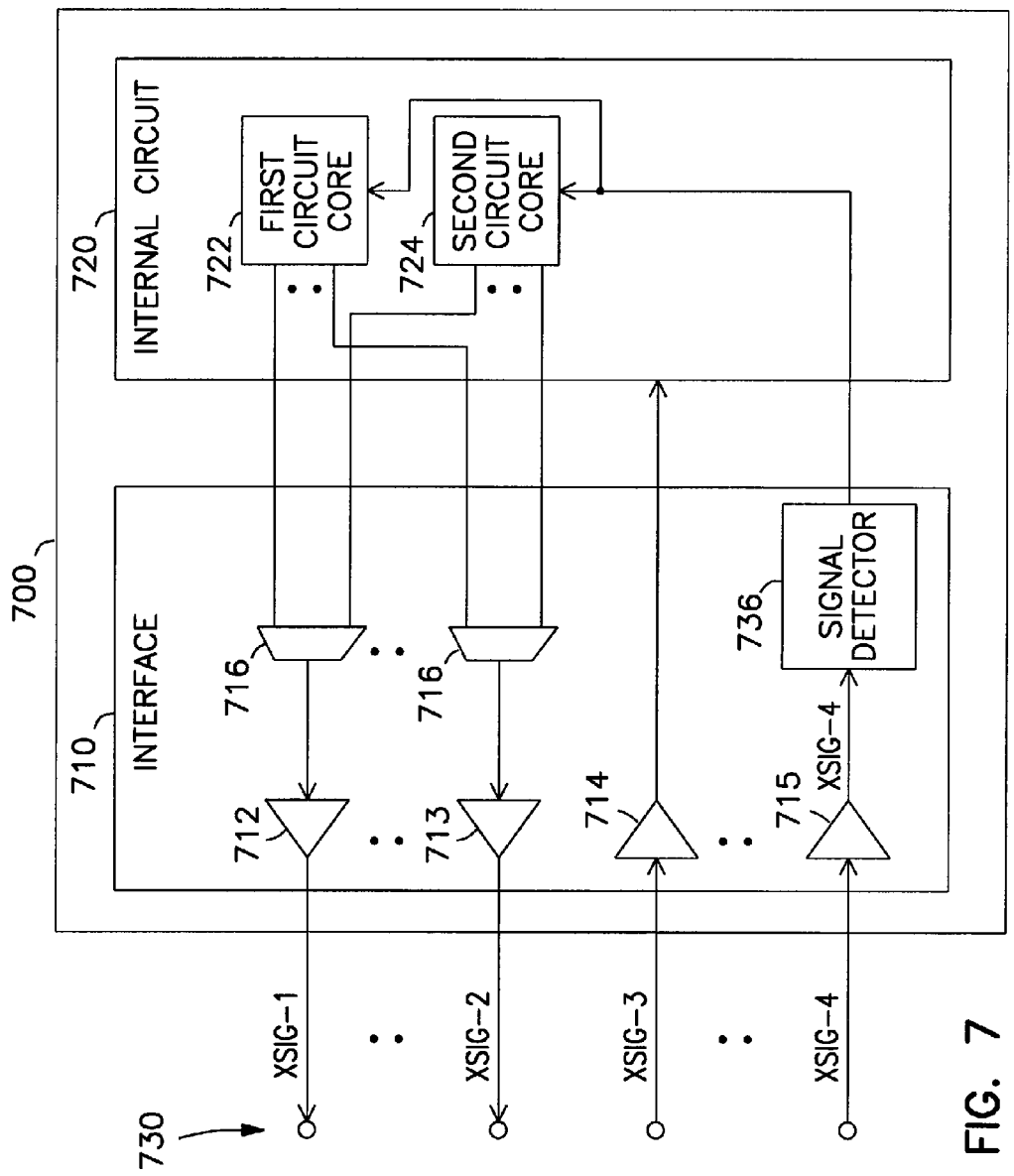
FIG. 7 shows an integrated circuit having an interface.

FIG. 7 shows an integrated circuit having an interface for transferring data. Integrated circuit 700 includes an interface 710 for transferring data between an internal circuit 720 and a plurality of terminals 730. Internal circuit 720 includes a first circuit core 722 and a second circuit core 724. Interface 710 has transmitters 712 and 713, receivers 714 and 715, multiplexers 716, and a signal detector 736. Interface 710 may have other transmitters, receivers 714 and 715, and multiplexers.

Transmitters 712 and 713 transfer data (signals) from either first circuit core 722 or second circuit core 724 to terminals 730 based on selections from multiplexers 716. Receivers 714 and 715 transfer data from terminals 730 to first and second circuit cores 722 and 724. Signal detector 736 provides an internal signal INT to first and second circuit cores 722 and 724 based on at least one of the signals received from terminals 730. A number of transfer signals XSIG-1 through XSIG-4 represent data at terminals 730. In some embodiments, the XSIG-1 through XSIG-4 have a frequency similar to the frequency of the XSIG signal of FIG. 1 through FIG. 6. Thus, the XSIG-4 signal and the INT in FIG. 7 have signal levels similar to that of the XSIG signal and the INT signal of FIG. 1 through FIG. 6.

Interface 710 is configured to operate at an operating frequency such that interface properly transmit and receive the XSIG-1 through XSIG-4 signals. Thus, the frequency of the XSIG-1 through XSIG-4 signals is within the operating frequency of interface 710. By using a method similar to the method described above in FIG. 1 through FIG. 6, interface 710 is able to receive a signal with a frequency lower than the frequency of the XSIG-1 through XSIG-4 signals or lower than the operating frequency of interface 710.

Receiver 715 and signal detector 736 may be configured to operate in a fashion similar to that of receiving circuit 120 of FIG. 1. In FIG. 7, signal detector 736 controls the signal levels of the INT signal based on the status of the XSIG-4 signal. For example, when signal detector 736 detects the presence of the repeated switching of the XSIG-4 signal, signal detector 736 switches the INT signal from a first signal level to a second signal level. When signal detector 736 detects the absence of the repeated switching of the XSIG-4 signal, signal detector 736 switches the INT signal from the second signal level back to the first signal level.

Signal detector 736 may have a construction similar to that of signal detector 124 of FIG. 1 or signal detector 600 of FIG. 6. For example, signal detector 736 may include a detect circuit to detect for changes in voltage levels represented by the XSIG-4 to identify the presence or absence of the repeated switching of the XSIG-4 signal. Signal detector 736 may also include a switching circuit to switch the INT signal between the first and second signal levels. Signal detector 736 may further include a holding circuit to hold the INT signal at a signal level based on the presence or absence of the repeated switching of the XSIG-4 signal.

In FIG. 7, signal detector 736 connects to one of the receivers 715 to provide the INT signal based on the XSIG-4 signal. In some embodiments, signal detector 736 may connect to at least two receivers (e.g., 714 and 715) to provide at least two internal signals similar to the INT signal based on at least two signals (e.g. XSIG-3 and XSIG-4) at terminals 730.

FIG. 7 shows that each of the transmitters 712 and 713 provides a single signal (e.g., XSIG-1) on a single line connected to one of the terminals 730. However, embodiments exist that each of the transmitters 712 and 713 may provide output differential signals on two separate lines connected to two separate terminals. Similarly, FIG. 7 shows that each of the receivers 714 and 715 receives a single signal (e.g., XSIG-4) on a single line connected to one of the terminals 730. However, embodiments exist that each of the receivers 714 and 715 may receive input differential signals from two separate lines connected to two separate terminals.

In some embodiments, interface 710 is configured to transfer data (signals) according to the peripheral component interconnect (PCI) express standard (specification) as described in the PCI Express Base Specification Revision 1.0 and PCI Express Card Electromechanical Specification Revision 1.0, both published by the PCI Special Interest Group (PCI-SIG), dated Jul. 22, 2002. In other embodiments, interface 710 is configured to transfer data according to the serial digital video output (SDVO) standard.

First core circuit 722 and second circuit core 724 may be configured to operate and contain data according to different standards. For example, first circuit core 722 may operate and contain data according to the PCI express standard; and second circuit core 724 may operate and contain data according to the SDVO standard.

Signal detector 736 may provide the INT signal for use as a status or a control signal in both the PCI express standard and the SDVO standard. For example, in the PCI express standard, the INT signal may be used as the signal present detect signal. As another example, in the SDVO standard, the INT signal may be used as the interrupt signal (SDVOB_Int+ or SDVOB_int−) or the stall signal (SDVO_Stall+ or SDVO_Stall−).

In some embodiments, integrated circuit 700 is included in a system controller to control graphics data or memory data or both. For example, integrated circuit 700 may be included in a graphics and memory controller hub (GMCH) of a chipset in a computer to provide either PCI express functionality interface or SDVO functionality interface. Integrated circuit 700 may also be included in a controller to control input and output (I/O) functionality in a system. For example, integrated circuit 700 may be included in an I/O control hub (ICH) of a chipset in a computer to provide I/O functionality interfaces between different devices.

Figure 8:
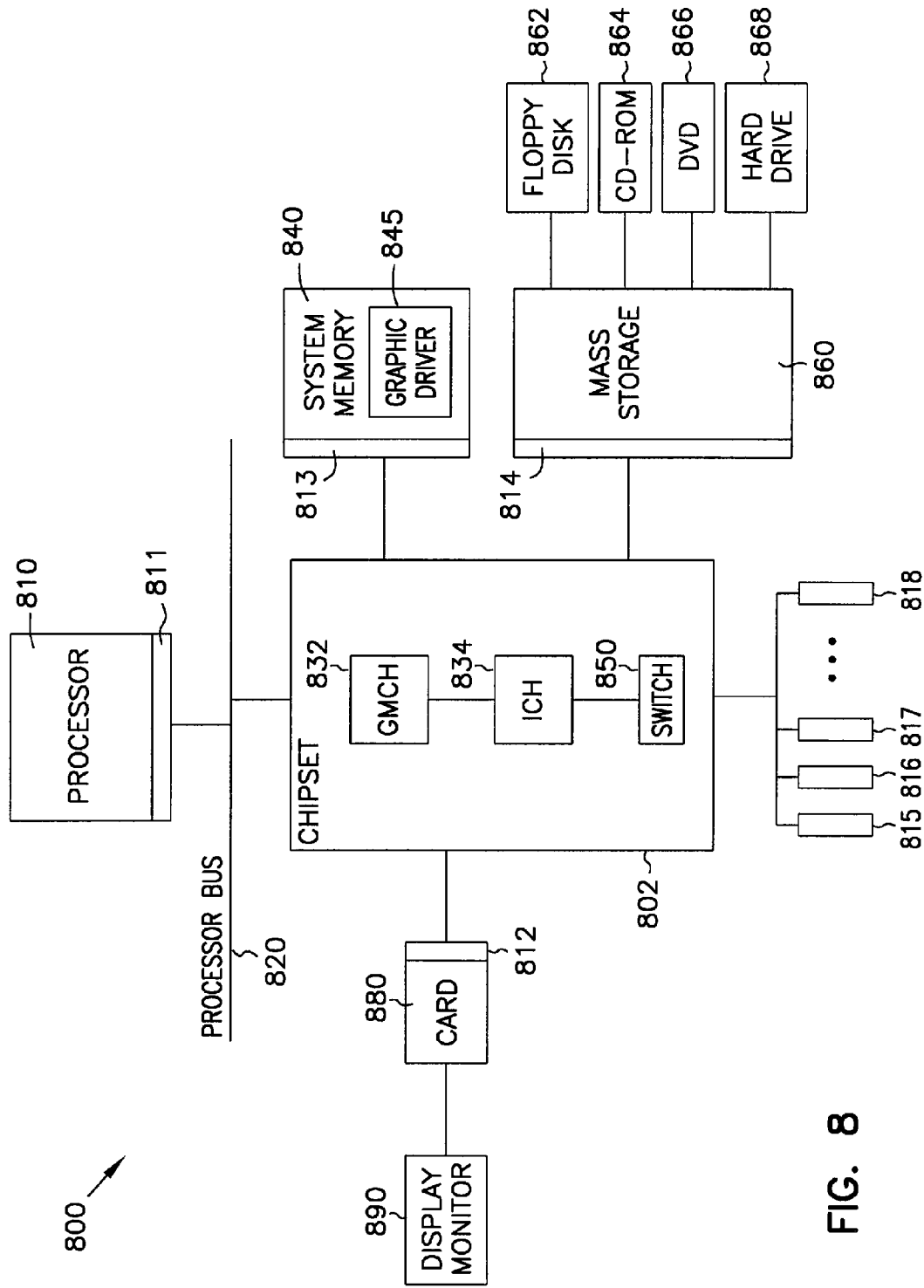
FIG. 8 shows a system including a chipset.

FIG. 8 shows a system 800 including a chipset 802. A number of connectors 811–818 connect chipset 802 to a number of devices such as a processor 810, a system memory (memory device) 840, a mass storage device 860, a card 880 and a display monitor 890. System 800 may include other devices of a computer which are not shown for clarity. All of the elements of system 800 may be located on a circuit board, for example, a motherboard. Connectors 811–818 include ports, slots, sockets, or other interfaces that allow different devices to connect together. Each of the connectors 811–818 includes a number of connection points such as solder ball contacts and pins. At least one of the connectors 811–818 is configured according to an interface standard, for example, the PCI express standard or the SDVO standard.

Chipset 802 may support one or more interfaces having a standard such as the PCI Express standard and the SDVO standard. Each interface defines a separate hierarchy domain. Each hierarchy domain may include a single endpoint or a sub-hierarchy containing one or more switch components and endpoints. Chipset 802 includes an integrated graphics and memory controller hub (GMCH) 832, an I/O hub controller (ICH) 834, and a switch 850.

GMCH 832 provides control and configuration of memory, graphics, and input/output (I/O) devices such as system memory 840 and the ICH 834.

ICH 834 has a number of functionalities to support I/O functions. ICH 834 may include a number of interface and I/O functions such as PCI bus interface, processor interface, interrupt controller, direct memory access (DMA) controller, power management logic, timer, system management bus (SMBus), universal serial bus (USB) interface, mass storage interface, low pin count (LPC) interface, and others.

In some embodiments, switch 850 is a logical assembly of multiple virtual PCI-to-PCI bridge devices and appears to the configuration software as two or more logical PCI-to-PCI bridges. In some embodiments, switch 850 provides PCI express interface to connectors 815–818.

FIG. 8 shows GMCH 832 and ICH 834 as two separate blocks representing two separated integrated circuits or chips. In some embodiments, GMCH 832 and ICH 834 may be integrated into one block representing a single integrated circuit or chip. In some embodiments, switch 850 may be located outside chipset 802.

Processor 810 represents a central processing unit of any type of architecture, such as embedded processors, mobile processors, micro-controllers, digital signal processors, vector processors, superscalar computers, single instruction multiple data (SIMD) computers, complex instruction set computers (CISC), reduced instruction set computers (RISC), very long instruction word (VLIW), or hybrid architecture.

A processor bus 820 provides interface signals to allow processor 810 to communicate with chipset 802 or with other processors and devices. Processor bus 820 may support a uni-processor or multiprocessor configuration. Processor bus 820 may be parallel, sequential, pipelined, asynchronous, synchronous, or any combination thereof.

System memory 840 stores information such as system code and data. System memory 840 may include dynamic random access memory (DRAM) or static random access memory (SRAM). System memory 840 may include program code or code segments implementing one embodiment of the invention. System memory 840 may also include a graphics driver 845. Any one of the elements of the graphics driver 845 may be implemented by hardware, software, firmware, microcode, or any combination thereof. System memory 840 may also include other programs or data such as an operating system.

Mass storage device 860 stores information such as code, programs, files, data, applications, and operating systems. Mass storage device 860 may include machine-readable media such as a floppy disk 862, a digital video/versatile disc (DVD) 864, a compact disk Read Only Memory (CD-ROM) 866, and a hard disk 868, and any other magnetic or optical storage device.

Card 880 may be a digital display card such as a graphics card. Card 880 may contain devices that provide digital display signals to drive display monitor 890. Card 880 is plugged into or connected to connector 812 to interact with GMCH 832 of chipset 802. In some embodiments, card 880 may be an Accelerated Graphics Port Digital Display second generation (ADD2) card.

Monitor 890 may be either an analog monitor or a digital monitor. For example, monitor 890 may be a flat panel display such as Liquid Crystal Display (LCD), electroluminescent display (ELD), gas-plasma display, a cathode-ray tube (CRT) display, or a television (TV) set. In some embodiments, card 880 is omitted and monitor 890 connects directly to connector 812 to interact directly with chipset 802.

In some embodiments, at least one of the devices of system 800 includes one or both of the transmitting and receiving circuits such as transmitting and receiving circuits 110 and 120 (FIG. 1). In other embodiments, at least one of the devices of system 800 includes embodiments of integrated circuit 800 (FIG. 8) having an interface such as interface 710 (FIG. 7). As described above in FIG. 1 through FIG. 7, transmitting and receiving circuits 110 and 120 (FIG. 1) and integrated circuit 700 (FIG. 7) allow transmission of a signal via an interface in which the signal has a frequency lower than the operating frequency of the interface.

At least one of the devices of system 800 provides an internal signal such as the INT signal in which the internal signal is generated based on a presence or absence of a repeated switching of an external signal transmitted to the interface of the device.

For example, either one or both of the GMCH 832 and ICH 834 of chipset 802 may include an interface such as interface 710 (FIG. 7) to provide an internal signal such as the INT signal to internal circuits of GMCH 832 or ICH 834. INT signal may represent the signal present detect signal according to the PCI express standard or the interrupt signal (SDVOB_Int+ or SDVOB_int−) or the stall signal (SDVO_Stall+ or SDVO_Stall−) according to the SDVO standard.

As another example, card 880 may include a transmitting circuit such as transmitting circuit 110 (FIG. 1) to transmit a signal such as the SEND signal to chipset 802 via connector 812 in which the signal may represent the signal present detect signal according to the PCI express standard or the interrupt signal (SDVOB_Int+ or SDVOB_int−) or the stall signal (SDVO_Stall+ or SDVO_Stall−) according to the SDVO standard.

In FIG. 8, system 800 represents computers such as a desktops, laptops, hand-held devices, servers, Web appliances, and routers. In some embodiments, system 800 may be included in wireless communication devices such as cellular phones, cordless phones, pagers, and personal digital assistants. System 800 may also be included in computer-related peripherals such as printers, scanners, and monitors, or entertainment devices such as televisions, radios, stereos, tape and compact disc players, video cassette recorders, camcorders, digital cameras, MP3 (Motion Picture Experts Group, Audio Layer 3) players, and video games.

Figure 9:
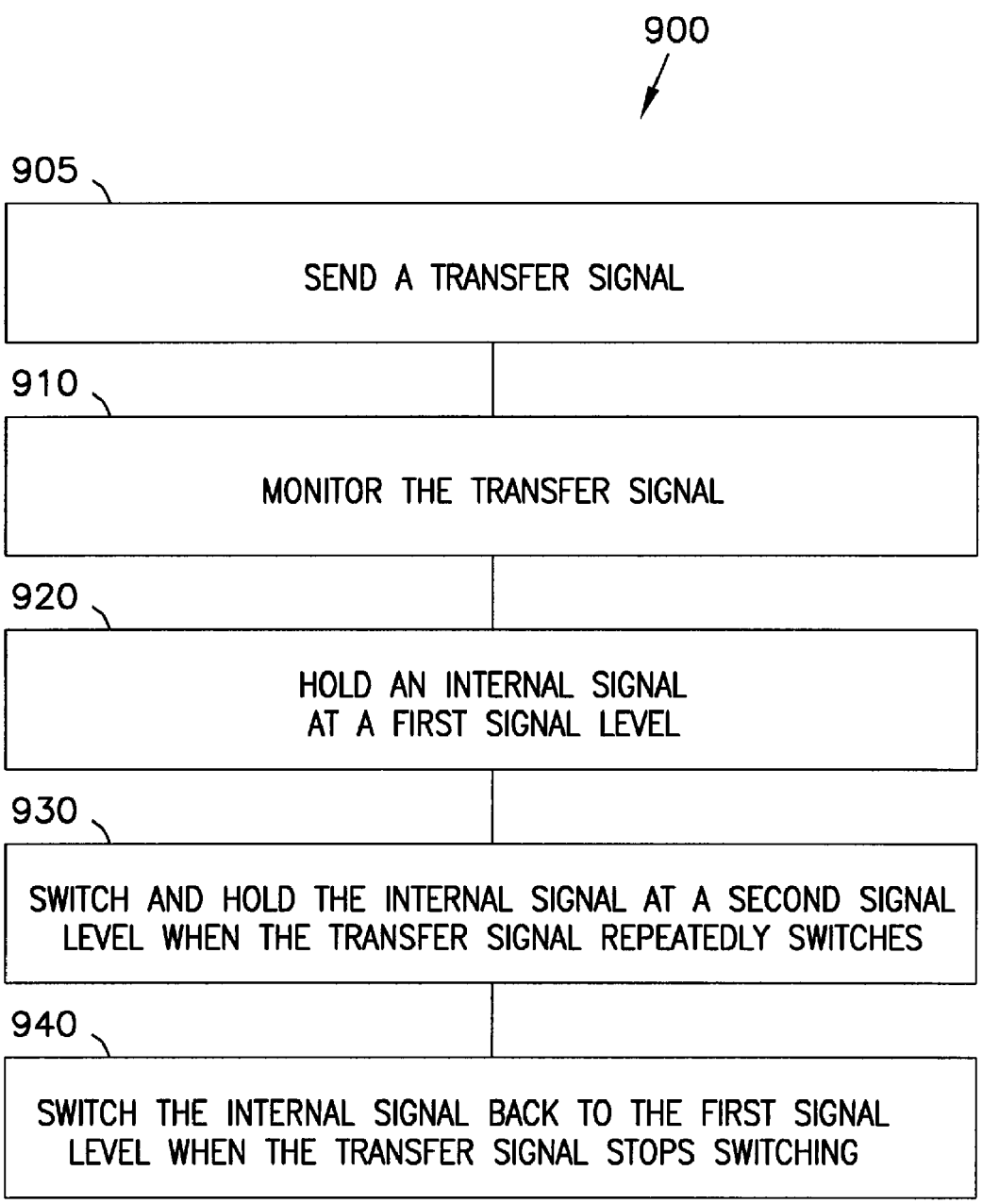
FIG. 9 is a flowchart of a method of transferring signals.

FIG. 9 is a flowchart of a method of transferring signals. Method 900 transfers a low frequency signal over a high frequency interface. Method 900 may be used in a system such as system 800 of FIG. 8.

Box 905 sends a transfer signal to a transmission line. The transfer signal may be generated based on a "send" signal in which the send signal has a frequency lower than the frequency of the transfer signal. The send signal has a first signal level and a second signal level. The first signal level may be a low signal level or a signal representing a logic zero. The second signal level may be a high signal level or a signal representing a logic one. Box 905 holds the transfer signal at the same signal level when the send signal has a first signal level. Box 905 repeatedly switches the transfer signal between the first and second signal levels when the send signal has a second signal level. The transfer signal has a cycle time. The transfer signal repeatedly switches when it has at least two consecutive cycles.

Box 910 monitors the transfer signal at a terminal connected to the transmission line. In some embodiments, box 910 monitors the transfer signal by detecting for changes in voltage levels representing the transfer signal at the terminal.

Box 920 holds an internal signal at the first signal level when the transfer signal remains constant at an initial signal level. The initial signal level may be either the first signal level or the second signal level.

Box 930 switches the internal signal from the first signal level to the second signal level and holds the internal signal at the second signal level when the transfer signal repeatedly switches between the first and second signal levels.

Box 940 switches the internal signal from the second signal level back to the first signal level when the transfer signal stops switching. The transfer stops switching when it stays at the same signal level for a time interval equal to at least one cycle time of the transfer signal.

Method 900 may be performed in any order. For example, any combination of the boxes 905, 910, 920, 930 and 940 may be performed in a serial fashion or in a parallel fashion.

What is claimed is:

1. A circuit comprising:
   a receiver including an input node to receive a transfer signal, and an output node to pass only the transfer signal from the input node to the output node; and
   a signal detector connected to the receiver to generate an internal signal based on the transfer signal, wherein the signal detector is configured to hold the internal signal at a first signal level when the transfer signal repeatedly switches between the first signal level and a second signal level, wherein the signal detector is configured to hold the internal signal at the second signal level when the transfer signal stops switching, wherein the transfer signal is transferred to the receiver based on a send signal, wherein the transfer signal repeatedly switches between the first and second signal levels when the send signal has a first selected level of the first and second signal levels, wherein the transfer signal stops switching when the send signal has a second selected level of the first and second signal levels, and wherein the send and internal signals have the same frequency.

2. The circuit of claim 1, wherein signal detector includes a detect circuit to detect for changes in voltage levels represented by the transfer signal.

3. The circuit of claim 2, wherein signal detector further includes a switching circuit to switch the internal signal between the first and second signal levels.

4. The circuit of claim 3, wherein signal detector further includes a holding circuit to hold the internal signal at one of the first and second signals.

5. An integrated circuit comprising:
   a plurality of terminals;
   a number of transmitters connected to a first group of terminals of the plurality of terminals to transmit signals to the first group of terminals;
   a number of receivers connected to a second group of terminals of the plurality of terminals to receive signals from the second group of terminals; and
   a signal detector connected to at least one of the receivers to control an internal signal based on a transfer signal received from a selected terminal of the second group of terminals by one of the receivers, wherein the signal detector is configured to switch the internal signal from a first signal level to a second signal level when the transfer signal repeatedly switches between the first and second signal levels, wherein the signal detector is configured to switch the internal signal from the second signal level back to the first signal level when the transfer signal stops switching, wherein the transfer signal is transferred to the selected terminal based on a send signal, wherein the transfer signal repeatedly switches between the first and second signal levels when the send signal has a first selected level of the first and second signal levels, wherein the transfer signal stops switching when the send signal has a second selected level of the first and second signal levels, and wherein the send and internal signals have the same frequency.

6. The integrated circuit of claim 5, wherein the transmitters and the receivers are configured to transfer data via the terminals according to peripheral component interconnect (PCI) express standard.

7. The integrated circuit of claim 5, wherein the transmitters and the receivers are configured to transfer data via the terminals according to serial digital video output (SVDO) standard.

8. The integrated circuit of claim 5, wherein the transmitters and the receivers are configured to transfer data via the terminals according both a peripheral component interconnect (PCI) express standard and a serial digital video output (SDVO) standard.

9. The integrated circuit of claim 5 further comprising a transmitting circuit, the transmitting circuit including:
   an input node to receive the send signal having the first and second signal levels; and
   an output node to transfer the transfer signal to the selected terminal of the second group of terminals.

10. A system comprising:
    a plurality of connectors, each of the connectors including a number of pins; and
    a chipset including a chipset interface connected to at least one of the connectors, the chipset interface including:
      a plurality of terminals connected to at least one of the connectors;
      a plurality of transmitters connected to the terminals, at least one of the transmitters is configured to transmit output differential signals;
      a plurality of receivers connected to the terminals, at least one of the receivers is configured to receive input differential signals; and
      a signal detector connected to at least one of the receivers to hold an internal signal at a first signal level based on a presence of a repeated switching of a transfer signal among the input differential signals, and to hold the internal signal at a second signal level based on an absence of the repeated of switching of the transfer signal, wherein the transfer signal is transferred to the receiver based on a send signal, wherein the transfer signal repeatedly switches between the first and second signal levels when the send signal has a first selected level of the first and second signal levels, wherein the transfer signal stops switching when the send signal has a second selected level of the first and second signal levels, and wherein the send and internal signals have the same frequency.

11. The system of claim 10, wherein one of the connectors is configured to transfer signals according to peripheral component interconnect (PCI) express standard.

12. The system of claim 10, wherein one of the connectors is configured to transfer signals according to serial digital video output (SDVO) standard.

13. The system of claim 10, wherein the interface of the chipset is configured to drive a digital display monitor.

14. The system of claim 10 further comprising a card having a number of pins connected to one of the connectors.

15. The system of claim 14, wherein the card includes a transmitting circuit, the transmitting circuit including:
    an input node to receive the send signal having a first signal level and second signal level; and
    an output node connected to one of the pins of the card to transfer the transfer signal to one of the pins.

16. The system of claim 10 further comprising a motherboard in which the connectors and the chipset are located.

17. The system of claim 10 further comprising a processor connected to one of the connectors.

18. A method comprising:
    receiving a transfer signal at an input node of a receiver and passing only the transfer signal from the input node to an output node of the receiver, wherein the transfer signal is transferred to the receiver based on a send signal, wherein the transfer signal repeatedly switches between the first and second signal levels when the send signal has a first selected level of first and second signal levels, and wherein the transfer signal stops switching when the send signal has a second selected level of the first and second signal levels;
    monitoring the transfer signal;
    holding an internal signal at a first signal level when the transfer signal stays at one of the first signal level and a second signal level;
    holding the internal signal at a second signal level when the transfer signal repeatedly switches between the first and second signal levels; and
    switching the internal signal from the second signal level to the first signal level when the transfer signal stops switching, wherein the send and internal signals have the same frequency.

19. The method of claim 18 further comprising: holding the internal signal at the first signal level after transfer signal stops switching.

20. The method of claim 18, wherein monitoring includes detecting for changes in signal levels of the transfer signal.

21. The method of claim 18, wherein one of the first signal level and the second signal level represents one of a voltage level and ground.

22. The method of claim 18, wherein each of send signal and the internal signal has a frequency lower than the frequency of the transfer signal.

23. A method comprising:
    monitoring a transfer signal;
    holding an internal signal at a first signal level when the transfer signal stays at one of the first signal level and a second signal level;
    holding the internal signal at a second signal level when the transfer signal repeatedly switches between the first and second signal levels; and
    switching the internal signal from the second signal level to the first signal level when the transfer signal stops switching, wherein the transfer signal is generated based on a send signal, wherein each of send signal and the internal signal has a frequency lower than the frequency of the transfer signal, and wherein the transfer signal repeatedly switches between the first and second signal levels when the send signal has the first signal level, wherein the transfer signal stops switching when the send signal level has the second signal level, and wherein the send signal and the internal signal have the same frequency.

24. The method of claim 18, wherein holding the internal signal at the first signal level occurs when the transfer signal stays at one of the first and second signal levels for a time interval equal to at least one cycle of the transfer signal.

25. The method of claim 24, wherein holding the internal signal at the second signal level occurs when the transfer signal repeatedly switches between the first and second signal levels such that the transfer signal has at least two consecutive cycles.

* * * * *